United States Patent [19]
Lange et al.

[11] Patent Number: 5,298,565
[45] Date of Patent: Mar. 29, 1994

[54] GRAFT COPOLYMERS AND LUBRICANTS CONTAINING SUCH AS DISPERSANT-VISCOSITY IMPROVERS

[75] Inventors: Richard M. Lange, Euclid; Carmen V. Luciani, Wickliffe, both of Ohio

[73] Assignee: The Lubrizol Corporation, Wickliffe, Ohio

[21] Appl. No.: 70,616

[22] Filed: Jun. 1, 1993

Related U.S. Application Data

[63] Continuation-in-part of Ser. No. 894,177, Jun. 3, 1992, abandoned, which is a continuation of Ser. No. 630,378, Dec. 18, 1990, abandoned, which is a continuation of Ser. No. 333,479, Apr. 5, 1989, abandoned.

[51] Int. Cl.$^5$ ............... C08F 279/02; C10M 107/14; C10M 149/10
[52] U.S. Cl. .................... 525/279; 525/281; 525/282; 525/283; 525/293; 525/296; 525/309; 525/315; 252/50
[58] Field of Search ............. 525/279, 282, 283, 293, 525/281, 296, 309, 315; 252/50

[56] References Cited

U.S. PATENT DOCUMENTS

| | | | |
|---|---|---|---|
| 2,970,129 | 1/1961 | Rugg et al. | 260/45.5 |
| 3,089,832 | 5/1963 | Black et al. | 204/158 |
| 3,243,481 | 3/1966 | Ruffing et al. | 260/880 |
| 3,356,763 | 12/1967 | Dollinger et al. | 260/880 |
| 3,378,492 | 4/1968 | Song et al. | 252/51 |
| 3,475,514 | 10/1969 | Nemphos et al. | 260/876 |
| 3,506,574 | 4/1970 | Stambaugh et al. | 252/51.5 |
| 3,567,798 | 3/1971 | Haefile et al. | 260/880 |
| 3,639,523 | 2/1972 | Hayter et al. | 260/880 |
| 3,723,575 | 3/1973 | Kern et al. | 260/879 |
| 3,862,265 | 1/1975 | Steinkamp et al. | 260/878 R |
| 3,891,721 | 6/1975 | Prudence | 260/879 |
| 3,953,541 | 4/1976 | Fuji | 525/293 |
| 4,026,967 | 5/1977 | Flexman, Jr. et al. | 260/878 R |
| 4,068,058 | 1/1978 | Engel et al. | 526/49 |
| 4,077,893 | 3/1978 | Kiovsky | 252/56 R |
| 4,085,055 | 4/1978 | Durand et al. | 252/50 |
| 4,092,255 | 5/1978 | Chapelet al. | 252/50 |
| 4,141,847 | 2/1979 | Kiovsky | 252/51.5 A |
| 4,146,489 | 3/1979 | Stambaugh et al. | 252/50 |
| 4,160,739 | 7/1979 | Stambaugh et al. | 252/34 |
| 4,161,452 | 7/1979 | Stambaugh et al. | 252/34 |
| 4,170,561 | 10/1979 | Chapelet et al. | 252/51.5 A |
| 4,181,618 | 1/1980 | Durand et al. | 252/51.5 A |
| 4,221,879 | 9/1980 | Humme et al. | 525/66 |
| 4,282,132 | 8/1981 | Benda et al. | 260/30.2 |
| 4,358,565 | 11/1982 | Eckert | 525/280 |
| 4,402,844 | 9/1983 | Tripka | 252/51.5 A |
| 4,409,120 | 10/1983 | Martin | 525/280 |
| 4,410,659 | 10/1983 | Lee et al. | 525/53 |
| 4,427,834 | 1/1984 | Martin | 525/280 |
| 4,476,283 | 10/1984 | Anderson | 525/53 |
| 4,490,267 | 12/1984 | Eckert | 252/56 R |
| 4,496,691 | 1/1985 | Proux et al. | 525/73 |
| 4,693,838 | 9/1987 | Varma et al. | 252/51.5 R |
| 4,780,228 | 10/1988 | Gardiner et al. | 252/51 |
| 4,952,637 | 8/1990 | Kapuscinski et al. | 525/293 |

FOREIGN PATENT DOCUMENTS

| | | |
|---|---|---|
| 0702502 | 1/1965 | Canada . |
| 1134090 | 10/1982 | Canada . |
| 0199453A2 | 10/1986 | European Pat. Off. ............. 151/2 |
| 0225048A2 | 6/1987 | European Pat. Off. . |
| 2319654 | 2/1977 | France . |
| 2398795 | 2/1979 | France . |

OTHER PUBLICATIONS
Database WPIL No. 81-57651D (1981).

*Primary Examiner*—Vasu S. Jagannathan
*Attorney, Agent, or Firm*—Joseph P. Fischer; Frederick D. Hunter, Sr.; James L. Cordek

[57] ABSTRACT

A graft polymer is prepared by grafting, onto a polymeric substantially saturated hydrocarbon backbone, a free-radical polymerizable vinyl nitrogen monomer, which grafting takes place with improved efficiency in the presence of minor amounts of a volatile aliphatic hydrocarbon substituted aromatic solvent capable of free-radical hydrogen atom chain transfer. The modified hydrocarbon based polymer finds utility as an additive for lubricating oils, particularly as dispersant-viscosity improvers for engine oils.

22 Claims, No Drawings

GRAFT COPOLYMERS AND LUBRICANTS CONTAINING SUCH AS DISPERSANT-VISCOSITY IMPROVERS

CROSS REFERENCE TO RELATED APPLICATIONS

This application is a continuation-in-part of copending application Ser. No. 07/894,177 filed Jun. 3, 1992 abandoned which is a continuation of application Ser. No. 07/630,378, filed Dec. 18, 1990, now abandoned which is a continuation of application Ser. No. 07/333,479 filed Apr. 5, 1989, now abandoned. The disclosures of these previous applications are incorporated herein by reference in their entirety.

FIELD OF THE INVENTION

This invention relates to novel, nitrogen-containing polymeric compositions. In particular, this invention relates to graft copolymers, methods of making such graft copolymers and the use thereof as dispersant-viscosity improvers for lubricating oils, and oil compositions and concentrates containing such graft copolymers.

BACKGROUND OF THE INVENTION

Many polymer materials are known. Numerous polymers have found use in lubricating oils as viscosity improving agents. These materials are also often referred to as viscosity index improvers. Multifunctional additives that provide both viscosity improving properties and dispersant properties are likewise known in the art. Such products are described in numerous publications including Dieter Klamann, "Lubricants and Related Products", Verlag Chemie Gmbh (1984), pp 185-193; C. V. Smalheer and R. K. Smith, "Lubricant Additives", Lezius-Hiles Co (1967); M. W. Ranney, "Lubricant Additives", Noyes Data Corp. (1973), pp 92-145, M. W. Ranney, "Lubricant Additives, Recent Developments", Noyes Data Corp (1978), pp 139-164; and M. W. Ranney, "Synthetic Oils and Additives for Lubricants", Noyes Data Corp. (1980), pp 96-166. Each of these publications is hereby expressly incorporated by reference.

The viscosity of lubricating oils, particularly the viscosity of mineral oil based lubricating oils, is generally dependent upon temperature. As the temperature of the oil is increased, the viscosity usually decreases. The function of a viscosity improver is to increase the kinematic viscosity of an oil at elevated temperatures with minimal increases in viscosity at low temperature. Thus, a viscosity improver enables an oil containing it to resist significant changes in viscosity with changes in temperature.

Dispersants are also well known in the lubricating art. Dispersants are employed in lubricants to keep impurities, particularly those formed during operation of an internal combustion engine, in suspension rather than allowing them to deposit as sludge.

One type of compound having both viscosity improving and dispersancy properties is comprised of a polymer backbone onto which backbone has been attached one or more monomers having polar groups. Such compounds are frequently prepared by a grafting operation wherein the backbone polymer is reacted directly with a suitable monomer.

Several methods for preparing such grafted polymers are known. One method involves thermal grafting of an activated olefin monomer onto a backbone containing unsaturated carbon-carbon bonds by a process known as the "ene" reaction. For example, maleic anhydride can be grafted onto an ethylene propylene diene modified (EPDM) polymer backbone. Usually the succinic derivative so obtained is further reacted with polar group containing reagents, such as amines, alcohols, etc. to provide dispersant-viscosity improvers. See for example U.S. Pat. No. 4,320,019 and U.S. Pat. No.4,357,250.

Another method for preparing graft copolymers for use as dispersant-viscosity improvers involves reacting a hydrocarbon based polymer backbone with a monomer containing a polar group in the presence of a free radical initiator. Numerous patents deal with the subject including U.S. Pat. No. 3,089,832; U.S. Pat. No. 4,181,618; and U.S. Pat. No.4,358,565.

The free-radical graft process is, in principle, a simple way to provide a measured degree of polarity to a hydrocarbon backbone polymer. In practice, however, several problems are encountered. Often the free-radical initiator will cause significant cross-linking of the polymer backbone, resulting in poor oil solubility and reduced effectiveness as a viscosity improver.

Furthermore, the use of alkyl peroxide initiators at high temperatures (in the range of 120-180° C.) frequently results in degradation of the polymer backbone, diminishing the average molecular weight and resulting in an undesirable loss of thickening power in the final product.

Other problems arise if the polar vinyl monomer itself undergoes significant homopolymerization or oligimerization rather than participating in the grafting process. As mentioned above, the purpose of the free radical graft process is to impart a measured degree of polarity to a hydrocarbon polymer when it is successfully attached to backbone. Ideally, the graft monomer will attach to the backbone polymer in monomeric units. Homopolymerization of the graft monomer is detrimental in several ways, and can adversely affect the nature of the products:

1. The polar homopolymer so produced is usually insoluble, and the resulting product is nonhomogeneous and hazy in appearance. Filtration of a highly viscous polymer solution to try to improve clarity by removing the suspended homopolymer is an undesirable processing step since it presents handling difficulties, increased time cycles and relatively poor efficiency.

2. The homopolymers so introduced are frequently detrimental to performance in lubricants, particularly when used at high temperatures or under oxidizing conditions.

3. Monomers converted to homopolymer are not available for grafting onto the resin substrate, and the effect of the polar group in providing the desired dispersancy is lost.

4. The grafting process becomes inefficient with respect to the utilization of raw materials.

The grafting process is often carried out in the presence of a solvent. The solvents employed in the prior art have generally been the same solvents used for preparing the backbone polymer. That is, they are present to reduce viscosity and to facilitate processing. These solvents are often specified as saturated hydrocarbons (e.g., cyclohexane) or haloaromatic compounds, neither of which normally undergo hydrogen-atom transfer to any significant degree. See, for example, U.S. Pat. No.

4,358,565, which teaches that the grafting process, carried out in the presence of free radical polymerization initiator, is suitably carried out in solvents which have a very low reactivity towards free radicals, e.g., dichlorobenzene, benzene and preferably, cyclohexane.

The problem of gelling has been recognized. European Patent Application 171167 teaches that gelling can be reduced by conducting the reaction in the presence of a free radical initiator and a chain stopping agent. Aliphatic mercaptans are preferred. Tertiary mercaptans and N,N-diethyl hydroxylamine are most preferred. Other chain stopping agents disclosed are cumene, alcohols, phenols, etc. This European Patent Application deals with chain stopping agents as a general class and prefers certain reactive materials as chain stopping agents. As will be discussed hereinafter, reactive chain stopping agents are not desirable when the graft polymer, prepared in the presence of these agents, is intended for use in lubricating oil compositions, and because they may interact in an adverse manner with the vinyl-nitrogen monomer.

SUMMARY OF THE INVENTION

It is an object of this invention to provide novel polymers. It is a further object to provide improved graft copolymers. Another object is to provide lubricating oil additives. These objects are accomplished by this invention which provides a graft polymer comprising an oil soluble or dispersible substantially saturated hydrocarbon polymer backbone onto which backbone has been grafted a free-radical-polymerizable vinyl nitrogen monomer, said grafting having taken place with improved efficiency in the presence of a minor amount of a volatile aliphatic hydrocarbon-substituted aromatic solvent, capable of free-radical hydrogen atom chain-transfer, selected from the group consisting of toluene, xylene, ethylbenzene, diethylbenzene, 1,2,4-trimethylbenzene, 1,2,3,5-tetramethylbenzene,1,2,4,5-tetramethylbenzene, mesitylene, tetralin, alkyl benzene bottoms, alkyl tetralins, alkyl naphthalenes and alkyl toluenes, such as 4-isopropyltoluene, containing a total of 1 to about 4 alkyl groups, wherein each alkyl group contains from 1 to about 6 carbon atoms, and the total number of carbon atoms in all alkyl groups does not exceed about 10, and phenyl substituted alkanes, wherein the alkane contains from 4 to about 9 carbons.

It is an additional object to provide a process for preparing the above-described polymer, which process avoids the above-described difficulties such as poor solubility, reduced effectiveness as dispersant/viscosity improvers and poor utilization of raw materials. This object is accomplished by the process of this invention which comprises reacting a free-radical-polmerizable vinyl nitrogen monomer with a hydrocarbon polymer in the presence of a catalytic amount of a free-radical generating reagent and a minor amount of a volatile aliphatic hydrocarbon-substituted aromatic solvent capable of free-radical hydrogen atom chain-transfer, which aromatic solvent is selected from the group described hereinabove.

Additive concentrates and lubricating compositions containing the graft copolymers of this invention are also contemplated.

These and other objects of the invention are described in detail hereinbelow, or will become apparent to those skilled in the art upon reading this disclosure.

DETAILED DESCRIPTION OF THE PREFERRED EMBODIMENTS

The invention encompasses a graft polymer comprising an oil soluble or dispersible substantially saturated hydrocarbon backbone onto which backbone has been grafted a free-radical-polymerizable vinyl nitrogen monomer, said grafting having taken place in the presence of a minor amount, as defined herein, of a volatile aliphatic hydrocarbon-substituted aromatic solvent capable of free-radical hydrogen atom chain-transfer. The graft polymer is prepared in the presence of a catalytic amount of a free-radical generating reagent.

As used herein, the terms "hydrocarbon", "hydrocarbyl" or "hydrocarbon based" mean that the group being described has predominantly hydrocarbon character within the context of this invention. These include groups that are purely hydrocarbon in nature, that is, they contain only carbon and hydrogen. They may also include groups containing substituents which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms.

In general, no more than about three non-hydrocarbon substituents or hetero atoms, and preferably no more than one, will be present for every 10 carbon atoms in the hydrocarbon or hydrocarbon based groups. Most preferably, the groups are purely hydrocarbon in nature, that is, they are essentially free of atoms other than carbon and hydrogen.

THE HYDROCARBON BACKBONE

The hydrocarbon backbone is an essentially hydrocarbon based polymer, usually one having a molecular weight (Mw) between 25,000 and 500,000, more often between 50,000 and 200,000. Molecular weights of the polymeric hydrocarbon backbone are determined using well-known methods described in the literature. Examples of procedures for determining molecular weights are gel permeation chromatography (also known as size-exclusion chromatography) and vapor phase osmometry. These and other procedures are described in numerous publications including:

P. J. Flory, "Principles of Polymer Chemistry", Cornell University Press (1953), Chapter VII, pp 266–316, and "Macromolecules, an Introduction to Polymer Science", F. A. Bovey and F. H. Winslow, Editors, Academic Press (1979), pp 296–312.

These publications are hereby incorporated by reference for relevant disclosures contained therein relating to the determination of molecular weight.

The backbone may contain aliphatic, aromatic or cycloaliphatic components, or mixtures thereof. The hydrocarbon polymer backbone is often hydrogenated to such an extent that the resulting hydrogenated polymer is substantially saturated, that is, it has olefinic unsaturation, based on the total number of carbon to carbon bonds in the polymer, of less than 5%. Preferably, the hydrogenated polymer will contain less than 2%, more preferably no more than 1% residual unsaturation. Most preferably, the hydrocarbon polymer backbone is exhaustively hydrogenated. Aromatic unsaturation is not considered olefinic unsaturation within the context of this invention.

In preferred embodiments, the hydrocarbon backbone is an oil soluble or dispersible polymer or copolymer selected from the group consisting of:

a) hydrogenated homopolymers of conjugated dienes, b) hydrogenated copolymers of a conjugated diene with one or more olefins or other conjugated dienes, c) copolymers of alpha-olefins having from 2 to about 18 carbon atoms, and d) hydrogenated lower olefin non-conjugated diene modified terpolymers.

Throughout the specification and claims the expression oil soluble or dispersible is used. By oil soluble or dispersible is meant that an amount needed to provide the desired level of activity or performance can be dissolved, dispersed or suspended in an oil of lubricating viscosity. Usually, this means that at least about 0.001% by weight of the material can be dissolved, etc., in a lubricating oil composition. For a further discussion of the terms oil soluble and dispersible, particularly "stably dispersible", see U.S. Pat. No. 4,320,019 which is expressly incorporated herein by reference for relevant teachings in this regard.

Examples of suitable hydrocarbon backbones are a) oil soluble or dispersible hydrogenated homopolymers of conjugated dienes including polymers of 1,3-dienes of the formula

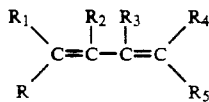

wherein each substituent denoted by R, or R with a numerical subscript, is independently hydrogen or hydrocarbon based, wherein hydrocarbon based is as defined hereinabove. Preferably at least one substituent is H. Normally, the total carbon content of the diene will not exceed 20 carbons. Preferred dienes for preparation of the homopolymer are piperylene, isoprene, 2,3-dimethyl-1,3-butadiene, chloroprene and 1,3-butadiene.

Suitable homopolymers of conjugated dienes are described, and methods for their preparation are given in numerous U.S. Pat. Nos., including the following:
3,547,821
3,835,053
3,959,161
3,965,019
4,085,055
4,116,917

As a specific example, U.S. Pat. No. 3,959,161 teaches the preparation of hydrogenated polybutadiene. b) oil soluble or dispersible hydrogenated copolymers of a conjugated diene with one or more olefins or other conjugated dienes.

Copolymers of conjugated dienes are prepared from two or more conjugated dienes. Useful dienes are the same as those described in the preparation of homopolymers of conjugated dienes hereinabove. The following U.S. Pat. Nos. describe diene copolymers and methods for preparing them:
3,965,019
4,073,737
4,085,055
4,116,917

For example, U.S. Pat. No. 4,073,737 describes the preparation and hydrogenation of butadiene-isoprene copolymers. U.S. Pat. No. 3,668,125 discusses block copolymers including polyvinylcyclohexene-hydrogenated polybutadiene-polyvinylcyclohexane.

Copolymers of conjugated dienes with olefins containing aromatic groups, e.g., styrene, methyl styrene, etc. are described in numerous patents including the following:

| | |
|---|---|
| 3,554,911 | 4,077,893 |
| 3,992,310 | 4,082,680 |
| 3,994,815 | 4,085,055 |
| 4,031,020 | 4,116,917 |
| 4,073,738 | 4,136,048 |
| | 4,145,298 |

For example, U.S. Pat. No. 3,554,911 describes a hydrogenated random butadiene-styrene copolymer, its preparation and hydrogenation.

(c) oil soluble or dispersible substantially saturated, including hydrogenated, copolymers of alpha-olefins having from 2 to about 18 carbon atoms.

These copolymers of alpha-olefins may be prepared from branched chain or linear alpha-olefins or mixtures thereof. Ziegler-Natta catalyzed copolymers are exemplary. Copolymers of alpha-olefins having from 2 to about 18 carbon atoms selected from the group consisting of Ziegler-Natta catalyzed copolymers of mixed aliphatic alpha-olefins and aliphatic alpha-olefin mixtures with styrene are preferred. Numerous patents, including the following, describe the preparation of copolymers of alpha olefins.

| | |
|---|---|
| 3,513,096 | 4,068,057 |
| 3,551,336 | 4,081,391 |
| 3,562,160 | 4,089,794 |
| 3,607,749 | 4,098,710 |
| 3,634,249 | 4,113,636 |
| 3,637,503 | 4,132,661 |
| 3,992,310 | 4,137,185 |
| 4,031,020 | 4,138,370 |
| 4,068,056 | 4,144,181 |

Ethylene-propylene copolymers are the most common copolymers of alpha-olefins. A description of an ethylenepropylene copolymer appears in U.S. Pat. No. 4,137,185.

d) hydrogenated oil soluble or dispersible lower olefin non-conjugated diene modified terpolymers.

There are numerous commercial sources for these lower olefin non-conjugated diene modified terpolymers. For example, Ortholeum ® 2052 (a product marketed by the DuPont Company) which is a terpolymer having about 48 mole % ethylene groups, 48 mole % propylene groups and 4 mole % 1,4-hexadiene groups, and numerous other such materials are readily available. Such materials and methods for their preparation are described in numerous patents including the following:
3,598,738
4,026,809
4,032,700
4,156,061
3,320,019
4,357,250

U.S. Pat. No. 3,598,738, which describes the preparation of ethylene-propylene-1,4-hexadiene terpolymers, is illustrative. This patent also lists numerous references describing the use of various polymerization catalysts.

Details of various types of polymers, reaction conditions, physical properties, and the like are provided in the above patents and in numerous books, including:

"Riegel's Handbook of Industrial Chemistry", 7th edition, James A. Kent Ed., Van Nostrand Reinhold Co., New York (1974), Chapters 9 and 10, P. J. Flory, "Principles of Polymer Chemistry", Cornell University Press, Ithaca, N.Y. (1953), "Kirk-Othmer Encyclopedia of Chemical Technology", 3rd edition, Vol 8 (Elastomers, Synthetic, and various subheadings thereunder), John Wiley and Sons, New York (1979), and U.S. Pat. No. 3,300,459.

Each of the above-mentioned books and patents is hereby expressly incorporated herein by reference for relevant disclosures contained therein.

VINYL NITROGEN MONOMERS

The hydrocarbon backbone, while contributing to the viscosity-improving characteristics of the products of this invention, by itself contributes little toward dispersancy in lubricants. The vinyl nitrogen monomer grafted onto the backbone provides the bulk of the contribution toward the dispersancy properties of the additive.

The vinyl nitrogen monomers used in this invention are free-radical polymerizable monomers. Numerous examples of suitable vinyl nitrogen monomers appear in the technical and patent literature.

Suitable monomers include

A. amides with vinyl groups, including acrylamide, methacrylamide, N-alkyl- and N,N-dialkyl-substituted acrylamides and methacrylamides, such as N-octyl acrylamide, N,N-dimethylmethacrylamide, and N-3-(N,N-dimethylamino)propylacrylamide or the corresponding methacrylamide, diacetone acrylamide, 2-acrylamido-2-methyl-1-propanesulfonic acid, and the like;

B. nitrogen containing acrylate and methacrylate esters, including, for example, dimethylaminoethyl methacrylate or acrylate;

C. imides, including N-vinyl succinimide and N-vinyl maleimide;

D. heterocyclic compounds having vinyl groups, such as 1. vinyl substituted lactams and thio analogs thereof, such as N-vinyl pyrrolidone and N-vinyl thiopyrrolidone and corresponding caprolactams and their alkyl substituted derivatives, 2. other vinyl substituted heterocyclic nitrogen compounds including vinyl substituted indoles, thiazoles, thiazolines, pyrroles, piperazines, oxazolines, imidazoles, including N-vinyl imidazole, carbazoles, including N-vinyl carbazole, and C-vinylpyridines, including ring-alkylated vinyl pyridines and exemplified by
2-methyl-5-vinylpyridine,
2-vinylpyridine, 4-vinylpyridine,
3,5-diethyl-4-vinylpyridine,
5-(n-octyl)-2-vinylpyridine,
3-(n-dodecyl)-2-vinylpyridine,
3,5-di-(n-hexyl)-4-vinylpyridine,
6-methoxy-2-vinylpyridine,
4-dimethylamino-2-vinylpyridine,
1,2-bis(2-pyridyl)ethylene, and 3. vinylquinolines;

E. N-vinyloxazolidone;

F. ethylenically substituted piperidines;

G. vinylmorpholines;

and the like.

As noted hereinabove, the nitrogen monomer when grafted onto the backbone provides a major contribution toward the dispersancy effect of the product. It has also been observed that when the N-vinyl compound further contains sulfur, particularly when sulfur and nitrogen are both present in a heterocyclic ring, the additive may also provide a significant antioxidant effect.

These and other nitrogen containing monomers are listed in the following U.S. Pat. Nos. and European patent applications, which are hereby expressly incorporated herein by reference for relevant disclosures contained therein.

| U.S. 3,089,832 | U.S. 4,092,255 | U.S. 4,427,834 |
| --- | --- | --- |
| U.S. 3,639,523 | U.S. 4,170,561 | U.S. 4,490,267 |
| U.S. 3,666,730 | U.S. 4,146,489 | U.S. 4,496,691 |
| U.S. 3,687,849 | U.S. 4,181,618 | EP 0171167 |
| U.S. 4,085,055 | U.S. 4,358,565 | EP 0199453 |

In general, the vinyl nitrogen monomer will be used in an amount ranging from about 0.01 to about 20.0 percent by weight based on the total weight of the hydrocarbon backbone. Preferably, the vinyl nitrogen monomer is used in an amount ranging from about 1 to about 15 percent by weight, more preferably from about 2 to about 10 percent by weight.

ALIPHATIC HYDROCARBON SUBSTITUTED AROMATIC SOLVENT

As described hereinabove, a free-radical polymerizable vinyl nitrogen monomer is grafted onto the hydrocarbon backbone in the presence of a minor amount of a volatile aliphatic hydrocarbon substituted aromatic solvent capable of free-radical hydrogen atom chain transfer.

A "volatile" solvent as defined herein has a boiling point at 760 millimeters mercury pressure (standard atmospheric pressure) of less than about 300° C., preferably from about 105° C. up to about 250° C., more preferably less than about 200° C., preferably from about 125° C. up to about 200° C.

The aliphatic hydrocarbon substituted aromatic solvent belongs to the class of aromatic compounds containing at least one benzylic hydrogen atom. That is, there is present a substituent containing at least one

group which is directly attached to an aromatic ring. Thus, the aliphatic hydrocarbon substituted aromatic solvent will contain components having the structure

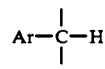

wherein Ar is an aromatic nucleus, such as a benzene nucleus. Ar may also be a polynuclear aromatic nucleus, for example, a fused ring nucleus, such as found in naphthalene, or it may be a linked type wherein at least two nuclei (either mono- or polynuclear) are linked by covalent bonds such as carbon-to-carbon bonds. Examples of suitable Ar groups are described in U.S. Pat. No. 4,100,082 which is hereby incorporated by reference for relevant disclosures contained therein. It is preferred that the aliphatic hydrocarbon substituted aromatic solvent is purely hydrocarbyl, that is, essentially free of atoms other than carbon and hydrogen. This solvent is used in an amount sufficient to prevent or inhibit crosslinking of the hydrocarbon backbone and to reduce the tendency of the vinyl nitrogen monomer to undergo homopolymerization.

The volatile hydrocarbon alkylated aromatic chain transfer agent is a critical element of this invention. Without the presence of this agent, extensive crosslinking of the polymer backbone may occur during the grafting process. Crosslinking can have an adverse effect on the solubility or dispersibility of the product. Rather than dissolve, extensively crosslinked polymers may simply swell with solvents, thus being rendered ineffective as a viscosity improver for lubricant formulations. Typical examples of gel formation during polymer processing may be found in various examples in U.S. Pat. No. 4,010,223, assigned to E. I. DuPont de Nemours.

Volatile materials are desirable because many chain-transfer agents of this type readily oxidize which is undesirable in a lubricant.

Furthermore, as mentioned hereinabove, the vinyl nitrogen monomers are free-radical polymerizable, and highly reactive. Accordingly, instead of grafting in a monomeric fashion onto free-radical sites generated on the backbone of the polymer substrate, the monomers can oligomerize at that site, to incorporate a "whisker" of multiple monomer units. A function of the volatile alkylated aromatic solvent is to terminate this growing monomer segment by hydrogen atom chain transfer, so that this polar segment remains small, and preferably monomeric. If the polar nitrogen monomer is allowed to oligomerize at the grafting site on the polymer backbone, there will consequently be fewer total sites bearing polar substituents, and the dispersant efficiency of the product may be diminished proportionately.

Homopolymerization of the polar nitrogen monomer may also occur away from the polymer grafting sites, in the body of the reaction mixture. Since the polymer is usually relatively nonpolar, while the monomers are very polar, contact between the two may be difficult, and the monomers will tend to agglomerate together throughout the reaction mixture. In those instances, the volatile hydrocarbon-alkylated aromatic solvent also serves the functions of both interfering with monomer association and promoting intimate monomer-polymer contact by mutual solvency, as well as acting as a chain transfer agent to inhibit the polymerization of unreacted monomers in solution. Without the hydrocarbon-alkylated aromatic solvent, homopolymers of the polar vinyl nitrogen monomers frequently form which result in hazy products, and impart this haze to subsequent lubricant blends. Removing the finely-divided homopolymers is difficult, and often impossible; the additional manufacturing steps involved can be wasteful and time-consuming, and can render the overall process economically unfeasible. No matter where such homopolymerization occurs, at grafting sites or in the bulk of the reaction mixture, the result is inefficient utilization of a costly raw material.

The volatile aromatic solvent used as the chain transfer agent in this invention has the particular advantage of being essentially non-reactive toward the hydrocarbon backbone and the vinyl nitrogen monomer. That is, the aliphatic hydrocarbon substituted aromatic solvent used as a chain-transfer agent when preparing the graft polymers of this invention resists reacting to form new chemical compounds with either the hydrocarbon backbone or the vinyl nitrogen monomer. Furthermore, if small amounts of the chain transfer agent used in preparing the graft polymer of this invention remains in the product, it will not react chemically with any of the other additives which may be present in an additive concentrate or lubricating composition containing the graft polymers. However, it is especially desirable to remove the chain-transfer agent because of it tendency to oxidize.

Numerous types of chain-transfer agents are known, and are often used in polymer chemistry to control molecular weight, to inhibit premature polymerization of active monomers, and to reduce crosslinking. However, many of the more active chain transfer agents are not chemically inert. For example, some of the most common types are mercaptans, compositions of general formula R—SH, where R can be alkyl, aryl, or other substantially hydrocarbyl groups. Mercaptans can have adverse effects when used in a lubricating composition containing additives with which they can interact. Furthermore, although they may act as chain transfer agents at relatively low levels, at high levels (greater than 1%) mercaptans can actually initiate polymerization of vinyl monomers and can also act as vulcanizing agents, inducing crosslinking and gellation of partially unsaturated polymers. Certain mercaptans are known to be toxic.

Mercaptans can also interact adversely with the polar monomers, both by salt formation between the acidic mercaptan and the basic nitrogen of the monomer, as well as by conjugate addition to the polymerizable vinyl portions of those molecules. Those monomers that do react with the mercaptans can be rendered unpolymerizable, and the salts that may be formed are contaminants which can be detrimental to the effectiveness and stability of the dispersant viscosity improver products. The deposits which are formed by thermal decomposition of these mercaptan salts, as well as the corrosion promoted by them, contribute negatively to engine operation.

The volatile hydrocarbon-alkylated aromatic chain transfer agents of this invention do not have these deficiencies. They will not interact adversely with basic nitrogen monomers, nor do they have an objectionable odor. In addition to solubilizing monomers, these aromatic transfer agents also act to promote contact between the various hydrocarbon polymer substrates and the polar monomers, resulting in enhanced efficiency of grafting.

The chain transfer agents of the present invention are chosen to provide a balance of adequate activity toward free radicals and yet are materials which, if small amounts remain in the graft copolymer, will not interact adversely or interfere with other additives which may be, and usually are, present in additive concentrates and finished lubricating oil blends. It is preferred, however, that the chain-transfer agent is substantially removed from the graft copolymer.

The chain transfer agents of this invention are volatile aliphatic hydrocarbon-substituted aromatic solvents capable of free-radical hydrogen atom chain transfer. The solvent usually has from 1 to 4 aliphatic hydrocarbon substituents. These materials must contain one or more benzylic hydrogen atoms on a hydrocarbon substituent on the aromatic ring. The simplest example is toluene, which bears three benzylic hydrogen atoms. Other representative examples of aromatic solvents capable of free-radical hydrogen atom transfer are the xylene isomers, ethylbenzene, diethylbenzene, 1,2,4-trimethylbenzene, 1,2,3,5-tetramethylbenzene, 1,2,4,5-tetramethylbenzene, mesitylene, tetralin, alkylbenzene bottoms, alkyl naphthalenes, alkyl tetralins, alkyl biphenyls, alkyl diphenyl oxide, and various alkyl toluenes, such as 4-isopropyltoluene, having from 1 to about 4 alkyl groups, wherein each alkyl group contains from 1 to about 6 carbon atoms, and the total number of carbon atoms in all alkyl groups does not exceed about 10. Chain transfer of dialkyl naphthalene is particularly efficient. Other useful aromatic solvents will occur to those skilled in the art. Toluene and xylene are preferred.

As discussed hereinabove, solvents have been used in the art to facilitate processing. Such solvents, such as cyclohexane, benzene and halogenated hydrocarbons do not undergo hydrogen atom chain transfer to any significant degree. Such solvents may, however, be used in the process of the present invention to facilitate processing, such as serving as diluents to reduce viscosity, provided that they do not interfere with the chain transfer agents employed in the process of this invention.

The amount of chain transfer agent employed depends on the molecular weight of the chain transfer agent and on its reactivity. Typically, the chain transfer agent is used in amounts from 15% to about 45% by weight, often from about 15% to about 35% by weight, and preferably from about 20% to about 35% by weight of the total weight, including any diluent, of the reaction mixture.

Extensive discussions of the mechanics and kinetics of chain transfer appear in Flory, "Principles of Polymer Chemistry", Cornell University Press (1953) and in Bovey and Winslow, "Macromolecules, An Introduction to Polymer Science", Academic Press (1979), which texts are hereby expressly incorporated herein by reference for relevant disclosures contained therein.

The graft copolymers may be prepared in different types of reactors including extruders and kettle-type reactors. With extruders, the solid or highly viscous polymer backbone may often be readily processed. On the other hand, for processes conducted in a kettle type reactor it is necessary that sufficient agitation of the reaction mixture is provided. Because of the solid or highly viscous nature of the polymer backbone, diluents are often used as fluidity modifying agents. Useful diluents include hydrocarbon diluents such as mineral oils, synthetic polyalphaolefins, etc., polyesters such as phthalate and adipate esters, etc. It is desirable that the diluent is a good solvent for the reactants and that it possesses little or no chain transfer properties. Hydrotreated oils are particularly useful since they possess the aforementioned desirable properties and furthermore resist attack by the nitrogen-containing monomer.

Amounts of diluent employed will be dictated by the desired degree of fluidity of the reaction mixture.

FREE RADICAL-GENERATING REAGENTS

Free radical generating reagents are well known to those skilled in the art. Examples include benzoyl peroxide, t-butyl perbenzoate, t-butyl metachloroperbenzoate, t-butyl peroxide, sec-butylperoxydicarbonate, azobisisobutyronitrile, potassium persulfate, and the like. Numerous examples of free radical-generating reagents, also known as free-radical initiators, are mentioned in the above-referenced texts by Flory and by Bovey and Winslow. An extensive listing of free-radical initiators appears in J. Brandrup and E. H. Immergut, Editors, "Polymer Handbook", 2nd edition, John Wiley and Sons, New York (1975), pages II-1 to II-40. Preferred free radical-generating reagents are t-butyl peroxide, t-butyl hydroperoxide, t-amyl peroxide, cumyl peroxide, t-butyl m-chloroperbenzoate and azobisisovaleronitrile.

The free-radical initiators are generally used in an amount from 0.01 to about 10 percent by weight based on the total weight of the hydrocarbon backbone. Preferably, the initiators are used at about 0.05 to about 1 percent by weight of the hydrocarbon backbone.

The reaction is conducted at temperatures ranging between about 80° C. to about 200° C., preferably between about 130° C. to about 170° C. Considerations for determining reaction temperatures include reactivity of the grafting system and the half-life of the initiator at a particular temperature.

The choice of free radical generating reagent can be an important consideration. For example, when a hydrocarbon polymer undergoing grafting with a monomer is diluted with a solvent such as a hydrocarbon oil, grafting of the vinyl nitrogen monomer onto the oil diluent may occur.

It has been observed that in the grafting of vinyl nitrogen monomers onto oil diluted styrene-diene copolymers, the choice of initiator affects the extent of grafting of the vinyl nitrogen monomer onto the oil diluent. Reducing the amount of monomer grafted onto the diluent usually results in an increased amount of monomer grafted onto the polymer backbone.

Azo group containing initiators, such as Vazo® polymerization initiators (DuPont) employed in the grafting process at about 95° C. result in a much higher degree of grafting onto the polymer backbone than do peroxide initiators such as t-butyl peroxide, employed at about 150-160° C.

The following examples illustrate the preparation of representative modified hydrocarbon-based polymers. Unless indicated otherwise, all parts and percentages are by weight, all temperatures are in degrees Celsius and pressures are in millimeters of mercury or Torr. These examples are illustrative, and are not intended to impose any limitation on the scope of this invention.

The general procedure for each experiment is to react a hydrogenated styrene-butadiene copolymer in oil, in aromatic solvent or in oil-aromatic solvent mixtures where the aromatic solvent content is varied, with a vinyl nitrogen containing monomer in the presence of tertiary butyl peroxide catalyst at about 120° C., followed by vacuum stripping to remove volatile components then dilution of the residue with mineral oil diluent. In each example, the concentration of vinyl nitrogen monomer and polymer substrate are held constant.

Specific details regarding each example are given in Table I. Examples 3 and 4 are illustrative of the invention. The remaining examples are comparative examples.

The products of the foregoing examples are subjected to dialysis to separate polymeric and non-polymeric components, the relative nitrogen content of the polymeric component indicating the relative efficiency of the grafting process. Grafting efficiency is indicated in Table I.

TABLE I

| | HYDROGENATED STYRENE/BUTADIENE (SB)/N-VINYL PYRROLIDONE (NVP) | | | | | |
|---|---|---|---|---|---|---|
| EXAMPLE NO. | SB (g) | OIL (g) | NVP (g) | XYLENE (g) | % | GRAFTING EFFICIENCY |
| 1 | 90 | 270 | 5.4 | 0 | 0 | 50 |
| 2 | 90 | 234 | 5.4 | 36 | 10 | 68 |
| 3 | 90 | 180 | 5.4 | 90 | 25 | 90 |
| 4 | 90 | 108 | 5.4 | 162 | 40 | 75 |
| 5 | 90 | 0 | 5.4 | 270 | 75 | 44 |

The products of this invention are useful as dispersant-viscosity improvers for lubricating oils. Depending on the particular nature of the vinyl nitrogen monomer, the graft copolymer may also provide additional benefits such as antioxidancy, corrosion inhibition, and the like. The lubricating oil compositions of this invention comprise a major amount of an oil of lubricating viscosity and a minor amount of the modified hydrocarbon based polymers of this invention. By a major amount is meant more than 50%. Thus, 51 percent, 80 percent and 99 percent are major amounts. A minor amount is less than 50 percent. Examples are percent, 25 percent and 49 percent. The amount of additive used will, of course, depend in part on whether a product is prepared in a diluent and on the molecular weight of the polymer backbone. The products are usually prepared as oil solutions to facilitate handling. The products of this invention are used in an effective amount to provide dispersant/viscosity improving properties to lubricating oils. Typically, on a neat chemical basis, the product is employed to provide from about 0.2 to about 10% by weight of the graft copolymer to the finished lubricating oil. More often, the product is used at about 0.4 to about 8%, preferably from about 0.5 to about 6% by weight of the finished lubricating oil.

When desired, the products can be prepared essentially diluent free in a device that provides mechanical working of the reaction mixture, such as in an extruder or masticator.

The finished lubricating oils may be prepared by dissolving or suspending the product of this invention directly in the base oil along with any other additives which may be used. More often, the additive is a component of an additive concentrate which may contain other additives as well and which usually will contain an inert organic diluent.

THE OIL OF LUBRICATING VISCOSITY

The lubricating compositions and methods of this invention employ an oil of lubricating viscosity, including natural or synthetic lubricating oils and mixtures thereof.

Natural oils include animal oils and vegetable oils (e.g. castor oil, lard oil) as well as mineral lubricating oils such as liquid petroleum oils and solvent-treated or acid-treated mineral lubricating oils of the paraffinic, naphthenic or mixed paraffinic-naphthenic types. Oils of lubricating viscosity derived from coal or shale are also useful. Synthetic lubricating oils include hydrocarbon oils and halosubstituted hydrocarbon oils such as polymerized and interpolymerized olefins, etc. and mixtures thereof, alkylbenzenes, polyphenyl (e.g., biphenyls, terphenyls, alkylated polyphenyls, etc), alkylated diphenyl ethers and alkylated diphenyl sulfides and the derivatives, analogs and homologs thereof and the like.

Alkylene oxide polymers and interpolymers and derivatives thereof where the terminal hydroxyl groups have been modified by esterification, etherification, etc., constitute another class of known synthetic lubricating oils that can be used.

Another suitable class of synthetic lubricating oils that can be used comprises the esters of dicarboxylic acids and those made from $C_5$ to $C_{12}$ monocarboxylic acids and polyols and polyol ethers.

Other synthetic lubricating oils include liquid esters of phosphorus-containing acids, polymeric tetrahydrofurans and the like, silicon-based oils such as the polyalkyl-, polyaryl-, polyalkoxy-, or polyaryloxy-siloxane oils and silicate oils.

Unrefined, refined and rerefined oils, either natural or synthetic (as well as mixtures of two or more of any of these) of the type disclosed hereinabove can be used in the compositions of the present invention. Unrefined oils are those obtained directly from a natural or synthetic source without further purification treatment. Refined oils are similar to the unrefined oils except they have been further treated in one or more purification steps to improve one or more properties. Rerefined oils are obtained by processes similar to those used to obtain refined oils applied to refined oils which have been already used in service. Such rerefined oils often are additionally processed by techniques directed to removal of spent additives and oil breakdown products.

Specific examples of the above-described oils of lubricating viscosity are given in Chamberlin III, U.S. Pat. No. 4,326,972 and European Patent Publication 107,282, both of which are hereby incorporated by reference for relevant disclosures contained therein.

A basic, brief description of lubricant base oils appears in an article by D. V. Brock, "Lubrication Engineering", Volume 43, pages 184–5, March, 1987, which article is expressly incorporated by reference for relevant disclosures contained therein.

OTHER ADDITIVES

As mentioned, the compositions of this invention may contain other components. The use of such additives is optional and the presence thereof in the compositions of this invention will depend on the particular use and level of performance required. The compositions may comprise a zinc salt of a dithiophosphoric acid. Zinc salts of dithiophosphoric acids are often referred to as zinc dithiophosphates, zinc O,O-dihydrocarbyl dithiophosphates, and other commonly used names. They are sometimes referred to by the abbreviation ZDP. One or more zinc salts of dithiophosphoric acids may be present in a minor amount to provide additional extreme pressure, anti-wear and anti-oxidancy performance.

In addition to zinc salts of dithiophosphoric acids discussed hereinabove, other additives that may optionally be used in the lubricating oils of this invention include, for example, detergents, dispersants, viscosity improvers, other than the viscosity improvers of this invention, oxidation inhibiting agents, pour point depressing agents, extreme pressure agents, anti-wear agents, color stabilizers and anti-foam agents. The above-mentioned dispersants and viscosity improvers are used in addition to the additives of this invention.

Auxiliary extreme pressure agents and corrosion and oxidation inhibiting agents which may be included in the compositions of the invention are exemplified by chlorinated aliphatic hydrocarbons, organic sulfides and polysulfides, phosphorus esters including dihydrocarbon and trihydrocarbon phosphites, molybdenum compounds, and the like.

Viscosity improvers (also sometimes referred to as viscosity index improvers) may be included in the compositions of this invention. Viscosity improvers are usually polymers, including polyisobutenes, polymethacrylic acid esters, diene polymers, polyalkyl styrenes, alkenylarene-conjugated diene copolymers and polyolefins. Multifunctional viscosity improvers, other than those of the present invention, which also have dispersant and/or antioxidancy properties are known and may optionally be used in addition to the products of this invention. Such products are described in numerous publications including those mentioned in the Background of the Invention. Each of these publications is hereby expressly incorporated by reference.

Pour point depressants are a particularly useful type of additive often included in the lubricating oils described herein. See for example, page 8 of "Lubricant Additives" by C. V. Smalheer and R. Kennedy Smith (Lezius-Hiles Company Publishers, Cleveland, Ohio, 1967). Pour point depressants useful for the purpose of this invention, techniques for their preparation and their use are described in U.S. Pat. Nos. 2,387,501; 2,015,748; 2,655,479; 1,815,022; 2,191,498; 2,666,748; 2,721,877; 2,721,878; and 3,250,715 which are expressly incorporated by reference for their relevant disclosures.

Anti-foam agents used to reduce or prevent the formation of stable foam include silicones or organic polymers. Examples of these and additional anti-foam compositions are described in "Foam Control Agents", by Henry T. Kerner (Noyes Data Corporation, 1976), pages 125–162.

Detergents and dispersants may be of the ash-producing or ashless type. The ash-producing detergents are exemplified by oil soluble neutral and basic salts of alkali or alkaline earth metals with sulfonic acids, carboxylic acids, phenols or organic phosphorus acids characterized by at least one direct carbon-to-phosphorus linkage.

The term "basic salt" is used to designate metal salts wherein the metal is present in stoichiometrically larger amounts than the organic acid radical. Basic salts and techniques for preparing and using them are well known to those skilled in the art and need not be discussed in detail here.

Ashless detergents and dispersants are so-called despite the fact that, depending on its constitution, the detergent or dispersant may upon combustion yield a non-volatile residue such as boric oxide or phosphorus pentoxide; however, it does not ordinarily contain metal and therefore does not yield a metal-containing ash on combustion. Many types are known in the art, and any of them are suitable for use in the lubricants of this invention. The following are illustrative:

(1) Reaction products of carboxylic acids (or derivatives thereof) containing at least about 34 and preferably at least about 54 carbon atoms with nitrogen containing compounds such as amine, organic hydroxy compounds such as phenols and alcohols, and/or basic inorganic materials. Examples of these "carboxylic dispersants" are described in British Patent number 1,306,529 and in many U.S. Pat. Nos. including the following:

| | | |
|---|---|---|
| 3,163,603 | 3,381,022 | 3,542,680 |
| 3,184,474 | 3,399,141 | 3,567,637 |
| 3,215,707 | 3,415,750 | 3,574,101 |
| 3,219,666 | 3,433,744 | 3,576,743 |
| 3,271,310 | 3,444,170 | 3,630,904 |
| 3,272,746 | 3,448,048 | 3,632,510 |
| 3,281,357 | 3,448,049 | 3,632,511 |
| 3,306,908 | 3,451,933 | 3,697,428 |
| 3,311,558 | 3,454,607 | 3,725,441 |
| 3,316,177 | 3,467,668 | 4,194,886 |
| 3,340,281 | 3,501,405 | 4,234,435 |
| 3,341,542 | 3,522,179 | 4,491,527 |
| 3,346,493 | 3,541,012 | RE 26,433 |
| 3,351,552 | 3,541,678 | |

(2) Reaction products of relatively high molecularly polyalkylene polyamines. These may be characterized as "amine dispersants" and examples thereof are described for example, in the following U.S. Pat. Nos.:

| | |
|---|---|
| 3,275,554 | 3,454,555 |
| 3,438,757 | 3,565,804 |

(3) Reaction products of alkyl phenols in which the alkyl groups contains at least about 30 carbon atoms with aldehydes (especially formaldehyde) and amines (especially polyalkylene polyamines), which may be characterized as "Mannich dispersants". The materials described in the following U.S. Pat. Nos. are illustrative:

| | |
|---|---|
| 3,413,347 | 3,725,480 |
| 3,697,574 | 3,726,882 |
| 3,725,277 | |

(4) Products obtained by post-treating the carboxylic amine or Mannich dispersants with such reagents as urea, thiourea, carbon disulfide, aldehydes, ketones, carboxylic acids, hydrocarbon-substituted succinic anhydrides, nitriles, epoxides, boron compounds, phosphorus compounds or the like. Exemplary materials of this kind are described in the following U.S. Pat. Nos.:

| | | | |
|---|---|---|---|
| 3,036,003 | 3,282,955 | 3,493,520 | 3,639,242 |
| 3,087,936 | 3,312,619 | 3,502,677 | 3,649,229 |
| 3,200,107 | 3,366,569 | 3,513,093 | 3,649,659 |
| 3,216,936 | 3,367,943 | 3,533,945 | 3,658,836 |
| 3,254,025 | 3,373,111 | 3,539,633 | 3,697,574 |
| 3,256,185 | 3,403,102 | 3,573,010 | 3,702,757 |
| 3,278,550 | 3,442,808 | 3,579,450 | 3,703,536 |
| 3,280,234 | 3,455,831 | 3,591,598 | 3,704,308 |
| 3,281,428 | 3,455,832 | 3,600,372 | 3,708,522 |
| | | | 4,234,435 |

(5) Interpolymers of oil-solubilizing monomers such as decyl methacrylate, vinyl decyl ether and high molecular weight olefins with monomers containing polar substituents, e.g., aminoalkyl acrylates or methacrylates, acrylamides and poly-(oxyethylene)-substituted acrylates. These may be characterized as "polymeric dispersants" and examples thereof are disclosed in the following U.S. Pat. Nos.:

| | |
|---|---|
| 3,329,658 | 3,666,730 |
| 3,449,250 | 3,687,849 |
| 3,519,565 | 3,702,300 |

The above-noted patents are incorporated by reference herein for their disclosures of ashless dispersants.

The above-illustrated additives may each be present in lubricating compositions at a concentration of as little as 0.001% by weight usually ranging from about 0.01% to about 20% by weight. In most instances, they each contribute from about 0.1% to about 10% by weight.

The various additives described herein can be added directly to the lubricant. Preferably, however, they are diluted with a substantially inert, normally liquid organic diluent such as mineral oil, naphtha, benzene, toluene or xylene, to form an additive concentrate. These concentrates usually comprise about 0.1 to about 80% by weight of the compositions of this invention and may contain, in addition, one or more other additives known in the art or described hereinabove. Concentrations such as 15%, 20%, 30% or 50% or higher may be employed.

The lubricating compositions of this invention are illustrated by the examples in the following Tables. The lubricating compositions are prepared by combining the specified ingredients, individually or from concentrates, in the indicated amounts and oil of lubricating viscosity to make the total 100 parts by weight. The amounts shown are parts by weight and, unless indicated otherwise, are amounts of chemical present on an oil-free basis. Thus, for example, an additive comprising 50% oil used at 10% by weight in a blend, provides 5% by weight of chemical. These examples are presented for illustrative purposes only, and are not intended to limit the scope of this invention.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

TABLE II

A series of engine lubricating oils is prepared by preparing a master blend consisting of a mineral oil base (CitCon stocks), 2.3 parts of a polyisobutylene-ethylene polyamine-polyol reaction product, 0.82 parts of a calcium overbased sulfonate, 0.83 parts of a zinc dialkylphosphorodithioate and 0.25 parts of a sulfurized Diels-Adler adduct, and adding thereto the following components:

| EXAMPLE | COMPONENT - PRODUCT OF EXAMPLE: | WEIGHT PERCENT |
|---|---|---|
| A | 3 | 2.01 |
| B | 4 | 2.25 |
| C | 3 | 0.62 |
| D | 3 | 1.3 |

TABLE III

| LUBRICATING COMPOSITIONS | EXAMPLE | |
|---|---|---|
| | E | F |
| Reaction product: polyisobutenyl succinic anhydride-ethylene polyamine | | 0.94 |
| Reaction product: polyisobutenyl succinic anhydride-ethylene polyamine-polyol | | 1.1 |
| Metal overbased sulfonate | 0.45 | 1.37 |
| Zinc dialkylphosphorodithioate | 0.64 | 1.19 |
| Calcium overbased sulfurized phenate | 0.17 | 1.86 |
| Neutral calcium sulfonate | 0.08 | |
| Commercial ethylene-propylene copolymer in oil | 3.5 | |
| Commercial polymethacrylate pour point depressant | | 0.4 |
| Silicone Antifoam | | 10 ppm |
| Product of Example 3 | | 1.5 |
| Product of Example 4 | 1.2 | |
| Mineral oil to bring total composition to 100 parts | Exxon Stocks | BP Stocks |

TABLE III

A series of SAE 10W-30 engine lubricating oils is prepared by preparing a master blend consisting of a mineral oil base (Exxon stocks), 0.94 parts of a polyisobutenyl succinic anhydride-ethylene polyamine reaction product, 1.16 parts of sulfurized alkyl phenol, 1.45 parts of zinc dialkylphosphorodithioate, 0.13 parts of alkylated diphenyl amine, 1.38 parts of overbased magnesium sulfonate, 0.6 parts of calcium overbased sulfonate and 10 ppm of silicone antifoam and adding thereto the following components:

| EXAMPLE | COMPONENT - PRODUCT OF EXAMPLE: | WEIGHT PERCENT |
|---|---|---|
| G | 3 | 2.03 |
| H | 4 | 2.25 |

What is claimed is:

1. A graft polymer, prepared by grafting onto an oil soluble or dispersible substantially saturated hydrocarbon polymer backbone, a free radical-polymerizable vinyl nitrogen monomer in the presence of from about 15% to about 45% by weight based on the total weight of the reaction mixture, of a volatile aliphatic hydrocarbon-substituted aromatic solvent, capable of free-radical hydrogen atom chain transfer, selected from the group consisting of toluene, xylene, ethylbenzene, diethylbenzene, 1,2,4-trimethylbenzene, 1,2,3,5-tetramethylbenzene, 1,2,4,5-tetramethylbenzene, mesitylene, tetralin, alkyl benzene bottoms, alkyl tetralins, alkyl naphthalenes and alkyl toluenes containing a total of from 1 to about 4 alkyl groups, wherein each alkyl group contains from 1 to about 6 carbon atoms, and the total number of carbon atoms in all alkyl groups does not exceed about 10, and phenyl substituted alkanes, wherein the alkane contains from 4 to about 9 carbons.

2. The graft polymer according to claim 1 wherein the backbone is an oil soluble or dispersible polymer or copolymer selected from the group consisting of
   a) hydrogenated homopolymers of conjugated dienes,
   b) hydrogenated copolymers of a conjugated diene with one or more olefins or other conjugated dienes,
   c) copolymers of alpha-olefins having from 2 to about 18 carbon atoms, and d) hydrogenated lower olefin non-conjugated diene modified terpolymers.

3. The graft polymer of claim 1 wherein the backbone is derived from monomers comprising conjugated dienes selected from the group consisting of 1,3,-butadiene and isoprene.

4. The graft polymer of claim 1 wherein the backbone comprises b) a hydrogenated copolymer of a conjugated diene with an olefin, wherein the olefin is selected from the group consisting of styrene and methyl styrene.

5. The graft polymer of claim 1 wherein the backbone comprises c) a hydrogenated copolymer of alpha-olefins having from 2 to about 18 carbon atoms which is selected from the group consisting of Ziegler-Natta catalyzed copolymers of mixed aliphatic alpha-olefins and aliphatic alpha-olefin mixtures with styrene.

6. The graft polymer according to claim 1 wherein the free radical-polymerizable, vinyl nitrogen monomer is selected from the group consisting of vinyl pyridines, N-vinylpyrrolidone, N-vinylcarbazole, N-vinylimidazole, N,N-dimethyl-aminoethylmethacrylate and the corresponding acrylate, N,N-dimethylaminopropyl methacrylamide and the corresponding acrylamide, diacetone acrylamide, N-alkyl maleamic acids and esters thereof, 2-vinyl-1,3-thiazolines, 2-vinyl-1,3-oxazolines, and 2-acrylamido-2-methyl-propane sulfonic acid.

7. The graft polymer according to claim 1 wherein the aromatic solvent is toluene or xylene.

8. A process for the preparation of a graft polymer, which process comprises reacting, at a temperature between about 80° C. and 200° C., a free radical-polymerizable vinyl nitrogen monomer with an oil soluble or dispersible hydrocarbon polymer backbone in the presence of a catalytic 6 amount of a free radical-generating reagent and from about 15% to about 45% by weight based upon the total weight of the reaction mixture, of a volatile aliphatic hydrocarbon-substituted aromatic solvent, capable of free-radical hydrogen atom chain-transfer, selected from the group consisting of toluene, xylene, ethylbenzene, diethylbenzene, 1,2,4-trimethylbenzene, 1,2,3,5-tetramethylbenzene, 1,2,4,5-tetramethylbenzene, mesitylene, tetralin, alkyl benzene bottoms, alkyl tetralins, alkyl naphthalenes and alkyl toluenes containing a total of from 1 to about 4 alkyl groups, wherein each alkyl group contains from 1 to about 6 carbon atoms, and the total number of carbon atoms in all alkyl groups does not exceed about 10, and phenyl substituted alkanes, wherein the alkane contains from 4 to about 9 carbons.

9. The process according to claim 8 wherein the hydrocarbon polymer backbone is an oil soluble or dispersible polymer or copolymer selected from the group consisting of
a) hydrogenated homopolymers of conjugated dienes,
b) hydrogenated copolymers of a conjugated diene with one or more olefins or other conjugated dienes,
c) copolymers of alpha-olefins having from 2 to about 18 carbon at atoms, and
d) hydrogenated lower olefin-diene modified terpolymers.

10. The process according to claim 9 wherein the hydrocarbon polymer is derived from monomers comprising conjugated dienes selected from the group consisting of 1,3-butadiene and isoprene.

11. The process according to claim 9 wherein the hydrocarbon copolymer comprises b) a hydrogenated copolymer of a conjugated diene with an olefin, wherein the olefin is selected from the group consisting of styrene and methyl styrene.

12. The process of claim 9 wherein c) the hydrocarbon copolymer comprises a copolymer of alpha-olefins having from 2 to about 18 carbon atoms, which is selected from the group consisting of Ziegler-Natta copolymers of mixed aliphatic alpha-olefins, and aliphatic alpha-olefin mixtures with styrene.

13. The process according to claim 8 wherein the free radical-polymerizable, vinyl nitrogen monomer is selected from the group consisting of vinyl pyridines, N-vinylpyrrolidone, N-vinylcarbazole, N-vinyl imidazole, N,N-dimethylaminoethyl methacrylate and the corresponding acrylate, and N,N-dimethylaminopropyl methacrylamide and the corresponding acrylamide, and 2-acrylamido-2-methyl propane sulfonic acid.

14. The process according to claim 9 wherein the aromatic solvent is toluene or xylene.

15. The process according to claim 8 wherein the hydrocarbon polymer is a styrene-diene copolymer and the free radical-generating reagent is an azo-group containing polymerization initiator.

16. A lubricating oil additive prepared by a process comprising reacting at a temperature between about 80° C. and 200° C., a free radical-polymerizable vinyl nitrogen monomer with a substantially saturated hydrocarbon polymer in the presence of a catalytic amount of a free radical-generating reagent and from about 15% to about 45% by weight, based upon the total weight of the reaction mixture, of a volatile aliphatic hydrocarbon-substituted aromatic solvent capable of free radical hydrogen atom chain-transfer, selected from the group consisting of toluene, xylene, ethylbenzene, diethylbenzene, 1,2,4-trimethylbenzene, tetralin, alkyl benzene bottoms, alkyl tetralins, alkyl naphthalenes and alkyl toluenes, wherein the alkyl group contains from about 3 to about 9 carbon atoms, and phenyl substituted alkanes, wherein the alkane contains from about 4 to about 9 carbons.

17. The lubricating oil additive of claim 16 wherein the hydrocarbon polymer is an oil soluble or dispersible polymer or a copolymer selected from the group consisting of
a) hydrogenated homopolymers of conjugated dienes,
b) hydrogenated copolymers of a conjugated diene with one or more olefins or other conjugated dienes,
c) copolymers of alpha-olefins having from 2 to about 18 carbon atoms, and
d) hydrogenated lower olefin non-conjugated diene modified terpolymers.

18. A concentrate for formulating lubricating compositions comprising a normally liquid, substantially inert organic solvent/diluent and from about 0.1 to about 80% by weight of the graft polymer described in claim 1.

19. A concentrate for formulating lubricating compositions comprising a normally liquid, substantially inert organic solvent/diluent and from about 0.1 to about 80% by weight of the lubricating oil additive described in claim 16.

20. A lubricating composition comprising a major amount of an oil of lubricating viscosity and a minor amount of the lubricating oil additive of claim 16.

21. A lubricating composition comprising a major amount of an oil of lubricating viscosity and a minor amount of the graft polymer according to claim 1.

22. A lubricating composition comprising a major amount of an oil of lubricating viscosity and a minor amount of the graft polymer according to claim 3.

* * * * *